Aug. 15, 1967

F. S. C. BRANCO ET AL 3,335,929

PLURAL CAPSTAN TAPE TRANSPORT

Filed Dec. 21, 1964

INVENTORS:
Flavio S. C. Branco
Wayne R. Johnson
Albert C. Kirilouckas

By Keith D. Beecher
Attorney

United States Patent Office 3,335,929
Patented Aug. 15, 1967

3,335,929

PLURAL CAPSTAN TAPE TRANSPORT

Flavio S. C. Branco, Van Nuys, Wayne R. Johnson, Woodland Hills, and Albert C. Kirilouckas, Granada Hills, Calif., assignors to Winston Research Corporation, Los Angeles, Calif., a corporation of California Filed Dec. 21, 1964, Ser. No. 419,664
2 Claims. (Cl. 226—108)

Figure 1:
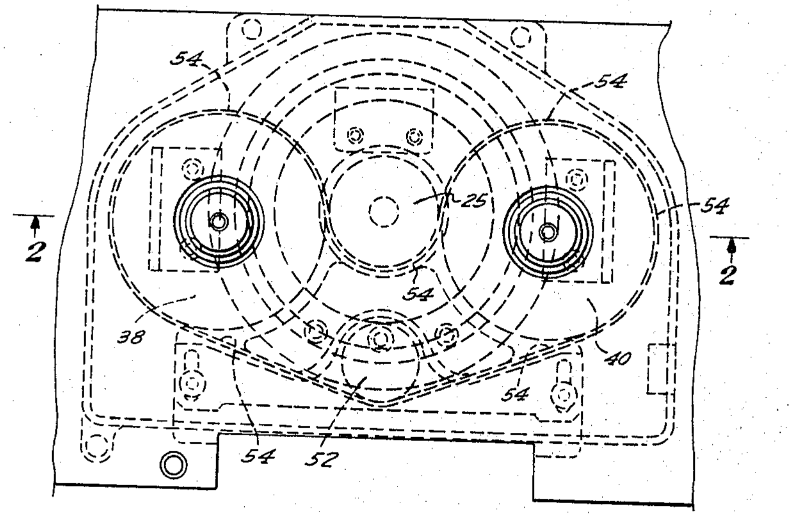

The present invention relates to high precision instrumentation type magnetic tape recorders/reproducers; and the invention relates more particularly to an improved tape transport assembly for use in such a mechanism for causing the magnetic recording tape to move along a particular path with a minimum of flutter and with a low time displacement error.

The precision instrumentation magnetic tape recorder/reproducer mechanism comprises a tape transport for drawing the magnetic tape along a particular path from a pay-off reel to a take-up reel. The mechanism also includes magnetic heads for recording information on the tape, and for reproducing information from the tape. It also includes a servo mechanism for accurately controlling the movement of the magnetic tape past the heads. Finally, the mechanism includes appropriate signal electronics circuitry for passing the electric signals to and from the heads.

The tape transport, as indicated, includes a pay-off, or supply reel, and a take-up reel, and it also includes one or more tensioning idlers for guiding the tape along a selected path between the two reels. The transport also includes one or more drive capstans which engage the tape and drive it past the heads from the supply reel to the take-up reel.

In a usual tape transport, for example, a rotatable capstan is positioned on one side of the tape path, and a rotatably mounted idler puck is positioned on the opposite side of the path. The puck is selectively moved against the tape by means, for example, of an appropriate solenoid control, so as to press the tape against the drive capstan. This action creates sufficient frictional force between the drive capstan and the tape to permit the capstan to draw the tape along its predetermined path.

A drive motor is mechanically coupled to the drive capstan in the usual prior art tape transport, and the motor causes the capstan to rotate continuously. Then, the movement of the tape may be controlled by the selected movement of the aforesaid puck against the tape.

As mentioned in copending application Ser. No. 250,084, filed Jan. 8, 1963, in the name of Albert C. Kirilouckas, now U.S. Patent No. 3,225,233, difficulty has been encountered in the past in the construction of tape transports suitable for use in precision instrumentation magnetic tape recorders/reproducers, where extremely low flutter and low time displacement errors are essential.

That is, such precision instrumentation magnetic tape recorders/reproducers require a tape transport which is capable of drawing the tape at a precisely constant, invariable speed across the sensitive faces of the heads. Any variation in the speed of the tape as it is drawn across the heads produces the aforesaid adverse flutter and high time displacement error effects.

The tape transport described in the aforesaid copending application includes two capstans which are positioned at spaced points along the path of the tape on opposite sides of the heads. These two capstans are rotatably driven with the lead capstan rotating at a slightly higher rate than the other capstan, so that the tape is drawn across the heads under tension. In this manner, variations in the rate at which the tape is drawn across the heads are minimized.

However, due to deficiencies in the usual prior art mechanical coupling assemblies, separate motors are usually used for driving each capstan in the dual capstan type of tape transport. For example, separate motors are used for the individual capstans in the system described in the copending application. This entails not only the need for a duplication of parts, but it also creates problems in the proper servo control of the two motors, in order that each motor may operate precisely in unison to draw the tape without flutter across the heads.

Although the desirability of using a single motor to drive both capstans was appreciated in the prior art, the compliance of the usual belt, or other means, for coupling the single motor to the two capstans served to set up mechanical resonant effects in the system. These mechanical resonances were of sufficient amplitude so that the operation of the precision type magnetic tape recorder was affected thereby to a material extent.

An object of the present invention is to provide an improved tape transport of the aforementioned double capstan type, but which is constructed so that both capstans may be driven by a single motor without in any way degrading the operation of the equipment to any appreciable extent from a flutter or time displacement error standpoint.

The aforesaid objective is achieved, for example, by providing a drive pulley on the drive motor shaft in substantial tangential relationship with a pair of driven pulleys, the latter being respectively affixed to the two capstans. A drive belt is looped around the pulleys in a manner such that the effective "length" of the belt between the drive pulley and the two driven pulleys is reduced practically to zero. This effectively reduces coupling compliance to a minimum. When the compliance is minimized, mechanical resonant frequencies are increased which, in turn, minimizes the amplitudes of mechanical resonances to a minimum for a given perturbance.

A general object of the present invention, therefore, is to provide an improved rugged and reliable double capstan type of tape transport for use in a high precision instrumentation type tape recorder/reproducer.

Another object of the invention is to provide such an improved tape transport which is relatively inexpensive as compared with prior art transports of the same general type, and yet which is fully capable of drawing the magnetic tape at an invariable speed across the transducer heads of the mechanism.

Figure 2:
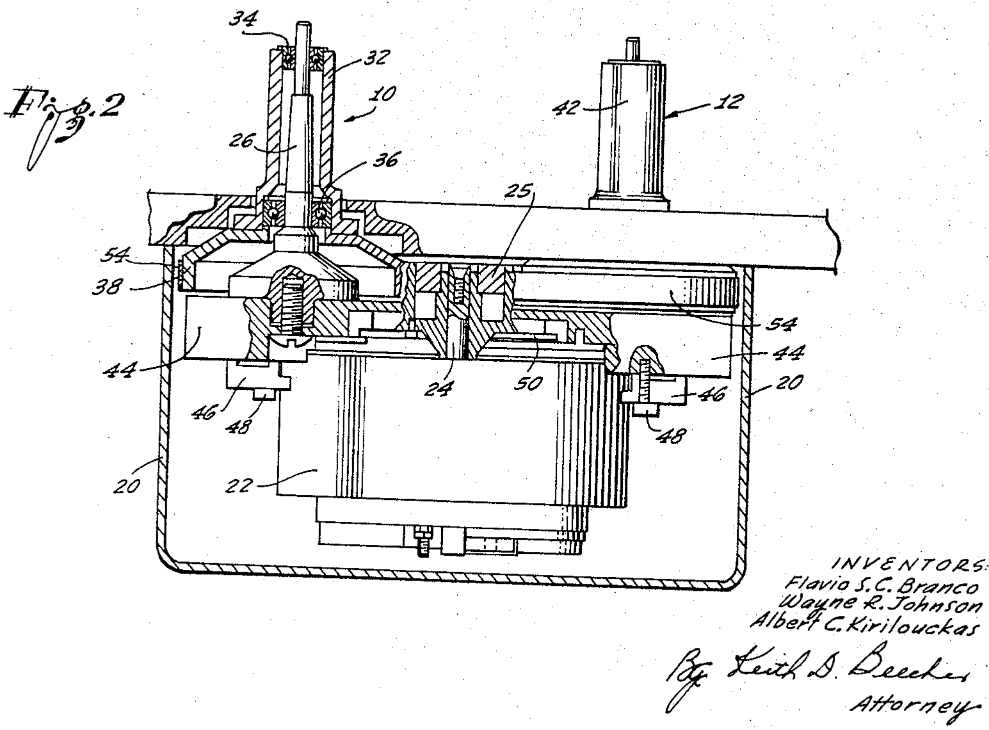

In the drawings:

FIGURE 1 is a plan view of a tape transport constructed in accordance with the invention; and FIGURE 2 is a sectional view of the tape transport taken substantially along the line 2—2 of FIGURE 1.

The improved tape transport of the present invention, as shown, for example, in FIGURE 2, includes a pair of capstan drive assemblies designated 10 and 12. These assemblies may be identical in their construction, and for that reason, only the capstan assembly 10 is shown in sectional detail. The capstan assemblies 10 and 12, as mentioned above, are positioned on opposite sides of the transducer heads of the instrumentation magnetic tape recorder/reproducer in which the transport is used. These capstans, as is well known, operate in conjunction with controllable pucks which may be selectively moved into position to squeeze the tape against the capstans, so that the capstans may draw the tape along its path from the supply reel to the take-up reel.

The double capstan drive assembly, of the type illustrated in FIGURES 1 and 2, serves to impart a drive to the magnetic tape at spaced points along the path of the tape on opposite sides of the heads of the equipment. As mentioned above, the provision of the double capstan type drive assembly serves to minimize any variations in the rate at which the tape is drawn across the heads, and which would otherwise occur due to variations in the elasticity of the tape material.

The transport assembly includes a housing 20 which may be formed of non-magnetic material such as aluminum. A motor 22 is mounted in the housing 20. This motor may be of any appropriate type, and it includes a drive shaft 24. A drive pulley 25 is mounted on the end of the drive shaft 24, to be disposed within the housing.

A stationary shaft 26 is rigidly supported on the housing 20 by means of a bolt. The stationary shaft has the configuration illustrated in FIGURE 1, for example, and it may be clamped at its outer end by means of an appropriate bracket (not shown).

The stationary shaft 26 is rigidly supported, therefore, by the bolt and by the aforesaid bracket, so that cantilever effects of the capstan drive may be eliminated, as discussed in the aforementioned copending application.

A hollow shaft 32 is rotatably supported on the stationary shaft 26 by means of a pair of bearings 34 and 36. The bearing 34 is positioned at the outer end of the hollow shaft 32, and the bearing 36 is positioned near the lower end of the shaft in FIGURE 2. The rotatable hollow shaft 32 is formed of an appropriate stiff, light material, so that it might have a relatively low inertia. The shaft 32 has a rigid body of relatively large diameter, so as to reduce compliance to a minimum and minimize all possible mechanical resonances of the shaft within the normal operation speeds of the mechanism.

A pulley 38 is affixed to the lower end of the rotatable shaft 32, and a similar pulley 40 is affixed to the lower end of a corresponding capstan shaft 42 of the capstan assembly 12.

It will be appreciated that the drive pulley 25 and the driven pulleys 38 and 40 are disposed in essentially uniplanar tangential relationship. It will also be appreciated that the drive pulley and the two driven pulleys are mounted for rotation about respective axes which are spaced from and parallel to one another.

The motor 22 is suspended from a base plate 44 by appropriate dogs 46 and bolts 48. The base plate also supports the stationary shafts, such as the shaft 26.

The motor 22 may be a printed circuit motor of the type produced and sold by Printed Motors, Inc., of Glen Cove, N.Y., and it may be specifically of the type described in a publication of that company entitled "A Status Report on the Printed Motor," by R. P. Burr, of the Circuit Research Company.

A tachometer disc 50 may be affixed to the drive shaft 24 to be rotated thereby, and this tachometer may be of any appropriate type, so that signals for controlling the speed of the motor 22 may be derived, in accordance with usual practice.

A belt tensioning idler 52 is also rotatably mounted in the housing. A drive belt 54 of the continuous type extends around the pulleys 38 and 40 in a closed loop. It will be observed that the drive pulley 25 is positioned to be adjacent the pulleys 38 and 40 in tangential relationship therewith, and the belt 54 passes between the drive pulley and the two driven pulleys 38 and 40, so that the drive pulley is disposed outside of the closed loop. The belt also extends around the idler 52, as best shown in FIGURE 1, so that the idler is disposed within the closed loop.

With the drive illustrated, there is an infinitesimal length of belt between the drive pulley and the drive pulleys. As mentioned above, this reduces the compliance of the belt essentially to zero. The minimum compliance of the belt increases the frequencies of the mechanical resonances of the system. As is well known, when the frequency of a mechanical resonance is increased, for a given perturbance, its amplitude is correspondingly decreased.

The illustrated belt configuration permits the drive pulley to impart rotational movement to the driven pulleys in the desired direction and at the desired rates, with negligible variations in the rotational speed of the driven pulleys due to imperfections in the constituency of the belt.

The improved tape transport of the present invention enables a single drive motor to be used, instead of two drive motors as is the case with the usual prior art, high precision, dual capstan tape transport. The use of a single drive motor reduces the cost of the tape transport materially, as compared with the usual two-motor type. Also, the use of a single motor, controlled in usual manner, permits the tape to be driven at a precise speed across the heads, and the problems encountered when it was attempted to control the two motors of the prior art assemblies for minimum flutter are overcome.

While a particular embodiment of the invention has been described, modifications may be made. The following claims are intended to cover all modifications which fall within the scope of the invention.

What is claimed is:

1. A magnetic tape transport including: a housing; an electric motor mounted in said housing; a first pulley mounted in said housing and mechanically coupled to said motor to be rotated thereby; first and second spaced capstan shafts rotatably mounted on said housing and having respective axes extending on opposite sides of said first pulley along a selected transverse axis and disposed in close proximity to said pulley; second and third pulleys coaxially affixed to respective ones of said capstan shafts in uniplanar and essentially tangential relationship with said first pulley; and a continuous drive belt extending as a closed loop around said second and third pulleys and passing between said first pulley and said second and third pulleys and around said first pulley so that said first pulley is disposed outside of said loop and said second and third pulleys are disposed inside of said loop, said second and third pulleys being spaced from said first pulley such that the effective length of said drive belt between said first pulley and each of said second and third pulleys is reduced to a minimum, whereby the coupling compliance in the system is minimized.

2. The tape transport defined in claim 1 and which includes a tensioning idler mounted in said housing and disposed within said loop to be engaged by said belt.

References Cited

UNITED STATES PATENTS

| | | | |
|---|---|---|---|
| 510,694 | 12/1893 | Marsh | 74—722 X |
| 716,520 | 12/1902 | Cole | 74—226 X |
| 3,140,620 | 7/1964 | Ferara | 74—221 |
| 3,191,834 | 6/1965 | Nakauchi | 226—181 X |

M. HENSON, WOOD, Jr., *Primary Examiner.*

A. N. KNOWLES, *Assistant Examiner.*